(12) United States Patent
Jacob et al.

(10) Patent No.: US 7,664,937 B2
(45) Date of Patent: Feb. 16, 2010

(54) SELF-CHECKING CODE FOR TAMPER-RESISTANCE BASED ON CODE OVERLAPPING

(75) Inventors: Matthias Jacob, Princeton, NJ (US); Mariusz H. Jakubowski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 370 days.

(21) Appl. No.: 11/681,160

(22) Filed: Mar. 1, 2007

(65) Prior Publication Data

US 2008/0215860 A1 Sep. 4, 2008

(51) Int. Cl.
*G06F 9/30* (2006.01)
*G06F 11/30* (2006.01)

(52) U.S. Cl. .................. 712/214; 712/205; 712/227; 713/194; 726/22; 726/26

(58) Field of Classification Search .............. 712/220, 712/205, 214, 227; 713/189, 190, 194; 726/22, 726/26
See application file for complete search history.

(56) References Cited

U.S. PATENT DOCUMENTS

| 6,389,451 | B1 * | 5/2002 | Hart | 709/201 |
|---|---|---|---|---|
| 6,694,435 | B2 * | 2/2004 | Kiddy | 713/189 |
| 6,757,831 | B1 * | 6/2004 | Folmsbee | 713/190 |
| 7,322,045 | B2 * | 1/2008 | Kiddy | 726/26 |
| 2003/0023859 | A1 * | 1/2003 | Kiddy | 713/189 |
| 2004/0151306 | A1 * | 8/2004 | Kiddy | 380/28 |
| 2005/0198526 | A1 * | 9/2005 | Marr et al. | 713/200 |
| 2006/0015855 | A1 * | 1/2006 | Kumamoto | 717/136 |
| 2006/0020549 | A1 * | 1/2006 | Stransky | 705/51 |
| 2006/0031686 | A1 * | 2/2006 | Atallah et al. | 713/190 |
| 2007/0039048 | A1 * | 2/2007 | Shelest et al. | 726/22 |

OTHER PUBLICATIONS

Badger, Lee; D'Anna, Larry; Kilpatrick, Doug; Matt, Brian; Reisse, Andrew; Van Vleck, Tom. "Self-Protecting Mobile Agents Obfuscation Techniques Evaluation Report". NAI Labs Report #01-036 Nov. 30, 2001. © Mar. 22, 2002. pp. 1-62.*

Oorschot, Paul C. von; Somayaji, Anil; and Wurster, Glenn. "Hardware-Assisted Circumvention of Self-Hashing Software Tamper Resistance". IEEE Transactions on Dependable and Secure Computing Apr.-Jun. 2005. pp. 82-92.*

* cited by examiner

*Primary Examiner*—Aimee J Li
(74) *Attorney, Agent, or Firm*—Lee & Hayes, PLLC

(57) ABSTRACT

Apparatus and methods for implementing software protection using code overlapping are disclosed. In one implementation, a combination block comprising a first sub-block of instructions with one or more interspersed obfuscation instructions is received. The obfuscation instructions interspersed among sequentially executable instructions of the first sub-block of instructions can include instructions from other sub-blocks as well as control instructions configured to guide a processor to execute all of the instructions in first sub-block of instructions in sequence. The obfuscation instructions are replaced with one or more replacement instructions. The replacement instructions can be of a same bit-length as the replaced obfuscation instructions. Moreover, the replacement instructions can include integrity checks configured to check for tampering with instructions and/or runtime program state in the first sub-block and/or the combination block.

20 Claims, 9 Drawing Sheets

```
                        ┌─412
                        ↓
                              ┌─308
    I1:  41         inc eax
                              ┌─402
         81 E0      and eax,...
                              ┌─310
    I2:  41         inc eax
                              ┌─408
         81 F1      xor ecx,...
                              ┌─410
         90         nop
                              ┌─316
         41         inc eax
                              ┌─404
         B8         mov eax,...
                              ┌─406
         90         nop
                              ┌─324
    I3:  C1 E1 02   shl eax,2
                              ┌─320
    O:              call <jmp>

⎧ <jmp>:    call <hash>
        ⎪
    414 ⎨           mov edx, &lookup_base
        ⎪
        ⎪           mov ecx, [edx+4*eax]
        ⎩
                    jmp ecx
```

I10:40          inc eax  ─308
                                        ─420
    81 E0 40 81 F1 90    and eax,90F18140h
                          ─316
    40           inc eax
                                     ─422
    B8 90 C0 E1 01    mov eax, 2E1C090h
                  ─320
    C3    ret

─418

I20:40            inc eax  ─310
                                        ─424
    81 F1 90 40 B8 90    xor ecx,90B84090h
                        ─324
    C0 E1 02    shl eax,2
                  ─326
    C3    ret
```

SELF-CHECKING CODE FOR TAMPER-RESISTANCE BASED ON CODE OVERLAPPING

BACKGROUND

Piracy of digital content, such as software and media files, is a prevalent issue in modern computer systems and networks. One way of preventing piracy of digital content is the creation of tamper resistant software. Tamper resistant software is created by embedding a protection code in a program code of the software, with the protection code allowing execution or access of digital content in the software only if a license associated with the digital content is found to be valid.

By embedding the protection code in the program code of the software, attackers can be prevented from simply removing a separate protection code module, thus leaving the program code unprotected.

SUMMARY

This summary is provided to introduce concepts relating to software protection using code overlapping which are further described below in the detailed description. This summary is not intended to identify essential features of the claimed subject matter, nor is it intended for use in determining the scope of the claimed subject matter.

Apparatus and methods for implementing software protection using code overlapping are disclosed. In one implementation, a combination block comprising a first sub-block of instructions with one or more interspersed obfuscation instructions is received. The obfuscation instructions interspersed among sequentially executable instructions of the first sub-block of instructions can include instructions from other sub-blocks as well as control instructions configured to guide a processor to execute the instructions of the first sub-block of instructions in sequence. The obfuscation instructions are replaced with one or more replacement instructions. The replacement instructions can be of the same bit-length as the replaced obfuscation instructions. Moreover, the replacement instructions can include integrity checks configured to check for tampering with instructions and/or runtime state in the first sub-block and/or the combination block.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

FIG. 4b illustrates an exemplary representation of a partially merged combination block of instructions including an integrity check.

FIG. 4c illustrates exemplary merged combination blocks of instructions.

DETAILED DESCRIPTION

Systems and methods for implementing software protection using code overlapping are described. Software protection using code overlapping can be implemented by interleaving instructions from two or more sub-blocks of instructions to create a combination block of instructions. Each sub-block in the combination block can still be executed in proper sequence through the use of incorporated control statements—such as jump statements. The control statements can direct a processor to jump over the instructions of other interspersed sub-blocks to the next instruction associated with a sub-block being executed.

The combination block can be further obfuscated when a sub-block is called for execution. This can be accomplished by replacing control instructions and interspersed instructions from other sub-blocks with either (1) semantically neutral instructions which do not affect the execution of the called sub-block, or (2) integrity checks configured to test integrity of the combination block and/or the called sub-block, including physical instructions and/or runtime state. The semantically neutral instructions and/or integrity checks can have a bit-length equivalent to that of the obfuscation instructions.

While aspects of described systems and methods can be implemented in any number of different computing systems, environments, and/or configurations, embodiments of software protection using code overlapping are described in the context of the following exemplary system architecture(s) and methods.

An Exemplary System

Figure 1:
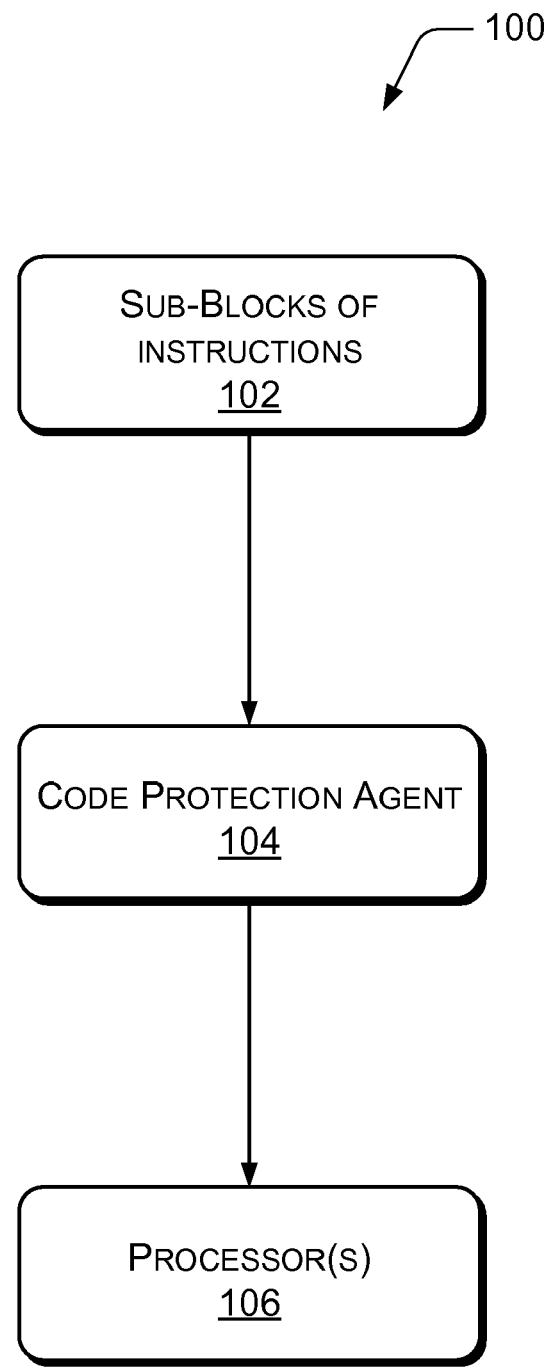
FIG. 1 illustrates an exemplary architecture implementing software protection using overlapping code.

FIG. 1 illustrates an exemplary architecture 100 in which software protection using overlapping code can be implemented. Architecture 100 includes two or more sub-blocks 102 of instructions, as well as a code protection agent 104, and one or more processor(s) 106.

Architecture 100 can be implemented in any number of computing-based devices or varied microprocessor-based architectures. Additionally, code protection agent 104 and processor(s) 106 can be coupled in a variety of ways. For example, code protection agent 104 can reside on a server coupled via a network connection to a computing-based device on which processor(s) 106 reside.

Sub-blocks 102 can include lines of instructions which can be executed by processor(s) 106. For example, lines of instructions in sub-blocks 102 can be expressed in a machine language or any other computer-readable instruction code. Also, each sub-block in sub-blocks 102 can include instructions, which when executed, correspond to a specific function or action.

Sub-blocks 102 can be obfuscated and formed into a combination block by code protection agent 104. For example, code protection agent 104 can receive sub-blocks 102 from various sources, including a memory, a computing-based device, and so on. Code protection agent 104 can then intersperse instructions such that instructions from one or more sub-blocks in sub-blocks 102 are interleaved among instructions from one or more other sub-blocks in sub-blocks 102.

Code protection agent 104 can also insert control instructions among the interspersed instructions resulting in a combination block. Control instructions can transfer the execution control of processor(s) 106 from one command line of a selected sub-block to a target command line corresponding to the same sub-block.

For example, code protection agent 104 can insert control instructions such as jump statements in the combination block instructing processor(s) 106 to jump from one line of instructions in a selected sub-block to a next sequential line of instructions in the selected sub-block. In this manner, the selected sub-block can be executed even though instructions in the selected sub-block may be separated from one another by intervening instructions from other sub-blocks in sub-blocks 102.

Code protection agent 104 can also replace obfuscation instructions (i.e., control instructions and intervening instructions from other sub-blocks lying between sequential instructions in a selected sub-block) with replacement instructions. In one implementation, the replacement instructions can be semantically neutral instructions which do not affect the execution of the selected sub-block.

Alternately, the replacement instructions can include instructions that perform integrity checks to detect tampering with the selected sub-block and/or the combination block, including physical instructions and/or runtime state. For example, integrity checks configured to detect tampering with physical instructions and/or a runtime state may be used to implement oblivious hashing. In one implementation, oblivious hashing can be implemented via overlapped code.

It will also be understood that the term "integrity checks" as used herein, includes other forms of checks. For example, integrity checks can include implicit checks arising due to a sharing of bytes between two or more instructions, such that tampering with one instruction may affect the other instructions with which bytes are shared.

Code protection agent 104 can pass on the combination block, including the instructions of the selected sub-block and the replacement instructions inserted by code protection agent 104, to processor(s) 106 for execution. During execution, individual instructions of the selected sub-block can be executed in a serial fashion by processor(s) 106.

The creation of combination blocks and the operation of code protection agent 104 will be discussed in more detail in conjunction with FIGS. 3-4 below.

Figure 2:
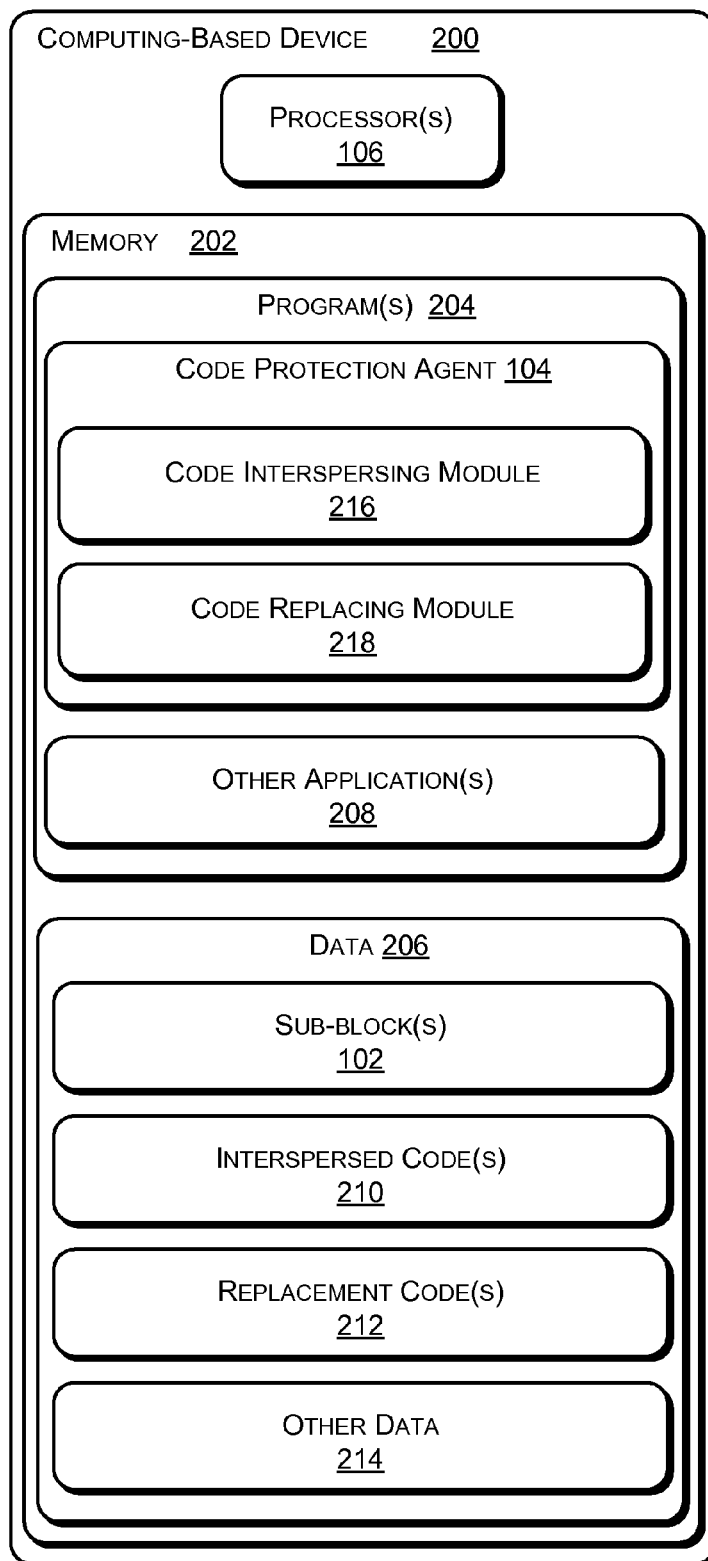
FIG. 2 illustrates a computing-based device including an exemplary code protection agent.

FIG. 2 illustrates an exemplary computing-based device 200 on which embodiments of software code protection through code overlapping can be implemented. Computing-based device 200 includes one or more processor(s) 106 and a memory 202. Processor(s) 106 can include, for example, microprocessors, microcomputers, microcontrollers, digital signal processors, central processing units, state machines, logic circuitries, and/or any devices that manipulate signals based on operational instructions. Among other capabilities, processor(s) 106 can be configured to fetch and execute computer-readable instructions stored in memory 202.

Memory 202 can include any computer-readable medium known in the art including, for example, volatile memory (e.g., RAM) and/or non-volatile memory (e.g., flash, etc.).

As illustrated in FIG. 2, memory 202 can also include program(s) 204 and data 206. Program(s) 204 can include code protection agent 104 and other application(s) 208 (such as word processor applications, spreadsheet applications, and so on).

Data 206 can include sub-blocks 102, interspersed code(s) 210, replacement code(s) 212, and other data 214, such as data associated with a general functioning of one or more programs—such as code protection agent 104 and other application(s) 208.

Code protection agent 104 includes a code interspersing module 216 and a code replacing module 218. In operation, code protection agent 104 receives sub-blocks 102 including one or more sub-blocks of instructions. Code interspersing module 216 intersperses the instructions of the received sub-blocks, and inserts one or more control instructions into the interspersed instructions, creating a combination block which can be stored in interspersed code(s) 210. The control instructions inserted into the combination block guide the flow of execution control of processor(s) 106 from one command line of a sub-block within the combination block to a next sequential command line of the sub-block.

For example, code interspersing module 216 can identify a first command line of a selected sub-block and insert a control instruction thereafter, directing processor(s) 106 to jump over intervening lines of code from other sub-blocks to a next command line of the selected sub-block. This process can be repeated until all available command lines associated with the selected sub-block are coupled with each other via control instructions.

Code interspersing module 216 can similarly couple command lines of all sub-blocks found in the combination block, such that execution control of each sub-block can circumvent command lines associated with other sub-blocks in the combination block. In addition, code interspersing module 216 can insert entry points or similar identifiers indicating a command line that is to be executed first when a specific sub-block in the combination block is to be executed.

Code replacing module 218 can scan through interspersed code(s) 210 to identify and flag locations of the control instructions inserted into the combination block by code interspersing module 216. Code replacing module 218 can also replace the control instructions, as well as instructions lying between sequential executable instructions in a called sub-block, with replacement instructions. The replacement instructions can be semantically neutral instructions which do not interfere with the execution of the called sub-block. Alternately, the replacement instructions can include integrity checks configured to detect tampering with instructions and/or runtime state in one or more of sub-blocks 102 in the combination block. In still another possible implementation, the replacement instructions can include a combination of integrity checks and semantically neutral instructions. Moreover, the replacement instructions can be of a same bit-length as instructions they replace in the combination block.

Figure 3:
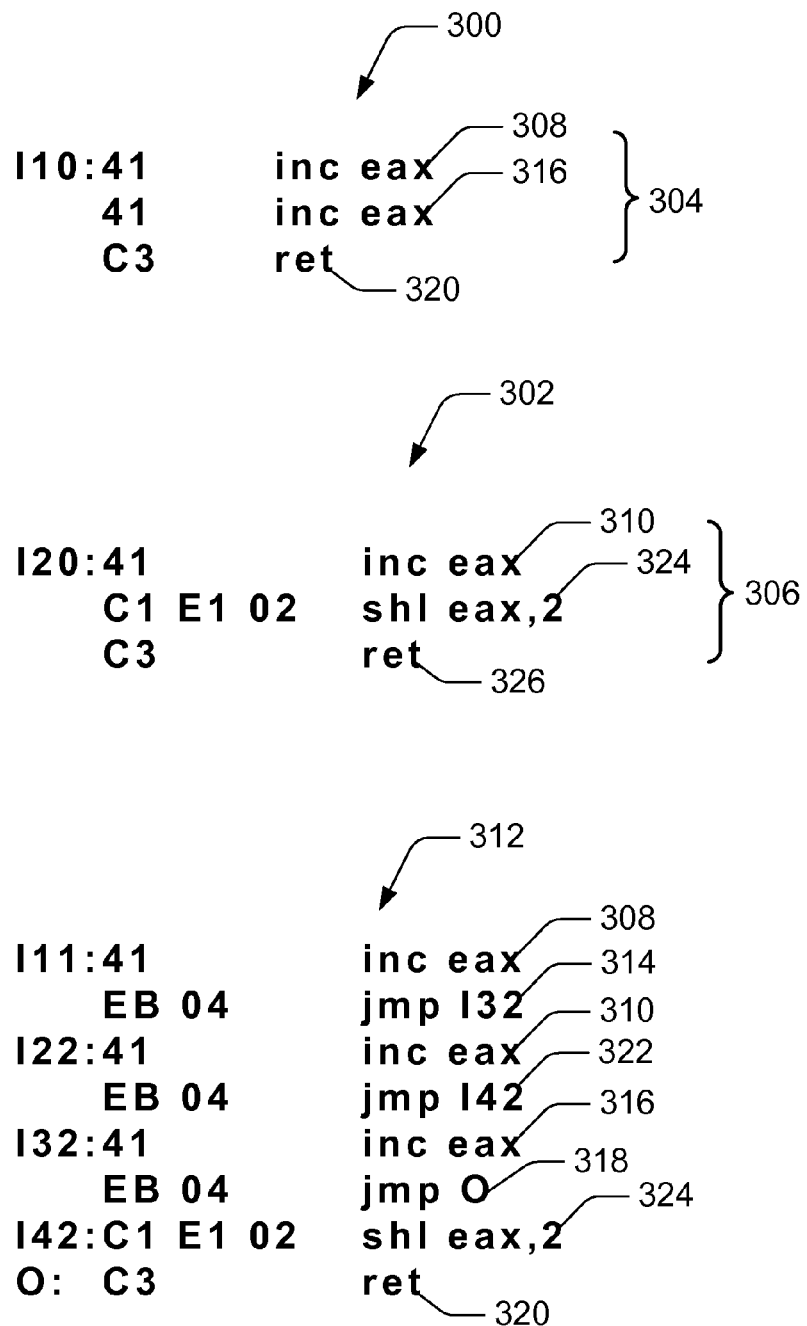
FIG. 3 illustrates exemplary representations of sub-blocks of instructions.

FIG. 3 illustrates exemplary sub-blocks 300, 302 which can be found in sub-blocks 102. Each of sub-blocks 300, 302 include one or more computer-readable instructions 304, 306, including a first command line 308, 310 respectively, followed by other instructions. In the instant example, sub-blocks 300, 302 include instructions 304, 306 corresponding to different functions. Even though only two sub-blocks 300, 302 are shown in FIG. 3, it will be understood that more sub-blocks could also be included in sub-blocks 102.

In one implementation, code interspersing module 216 can intersperse instructions 304, 306 of sub-blocks 300, 302 respectively, to form an interspersed combination block 312. Combination block 312 can be stored for example, in interspersed code(s) 210.

To maintain a sequential flow through all of instructions 304, 306 of sub-blocks 300, 302, combination block 312 can be embedded with control instructions which direct processor(s) 106 to execute successive instructions 304, 306 of a selected sub-block 300, 302 in combination block 312. In one implementation, the control instructions can be inserted into combination block 312 by code interspersing module(s) 216.

For example, first command line Il1 in combination block 312 (corresponding to first command line 308 in sub-block 300) can be followed by a jump instruction 314. Jump instruction 314 can direct processor(s) 106 to jump to line 132 in combination block 312 and execute instruction 316 after instruction 308 is executed. Similarly, jump instruction 318 following instruction 316 can direct processor(s) 106 to jump to line 0 in combination block 312 and execute instruction 320 after instruction 316 is executed. In this way, processor(s) 106 can enter combination block 312 at line I11 and sequentially execute instructions 308, 316 and 320, thus accomplishing the same function as would have been accomplished by sequentially executing instructions 304 of sub-block 300.

A similar series of control instructions can be inserted into combination block 312 to implement the function of sub-block 302. For example, after executing line 122 in combination block 312 (corresponding to line 310 in sub-block 302), processor(s) 106 can be directed by jump statement 322 to execute line 142 of combination block 312 (corresponding to line 324 in sub-block 302). Then processor(s) can execute line 0 of combination block 312 (corresponding to line 326 in sub-block 302).

In one implementation, code interspersing module 216 can store the addresses of lines Il1 and 122 in combination block 312 (corresponding to start command lines 308 and 310 of sub-blocks 300 and 302, respectively) and mark them as entry points for sub-blocks 300, 302, respectively.

The interspersing of instructions associated with sub-blocks 102, such as instructions 304, 306 in sub-blocks 300, 302, to form combination block 312 can be implemented dynamically. For example, the following algorithm can be used for implementing code interspersing:

| 1 | Read in two basic blocks B1 and B2 with instructions B1=(I11,I12,...,I1M) and B2 = (I21,I22,...,I2N). |
|---|---|
| 2 | For i= 1 to minimum (M,N) |
|   | a. Append (B3, I1i) |
|   | b. Append (B3, jmp (EIP+length(I2i)) |
|   | c. Append (B3, I2i) |
| 3 | Next i |

Where B1 and B2 can correspond either of sub-blocks 300, 302, and B3 can correspond to combination block 312. The algorithm presented above recites jmp as a control instruction. It will also be understood, however, that control instructions other than jmp known in the art can be utilized with the algorithm.

Once an interspersed combination block, such as combination block 312, is formed further, obfuscation can be carried out. For example, when a selected sub-block in an interspersed combination block is chosen, at run time the control instructions and intervening instructions from other sub-blocks between instructions in the selected sub-block can be replaced with replacement instructions. These replacement instructions can have a same bit length as the instructions they replace. Moreover, the replacement instructions can include semantically neutral instructions that don't affect the performance of the selected sub-block and/or integrity checks.

Figure 4A:
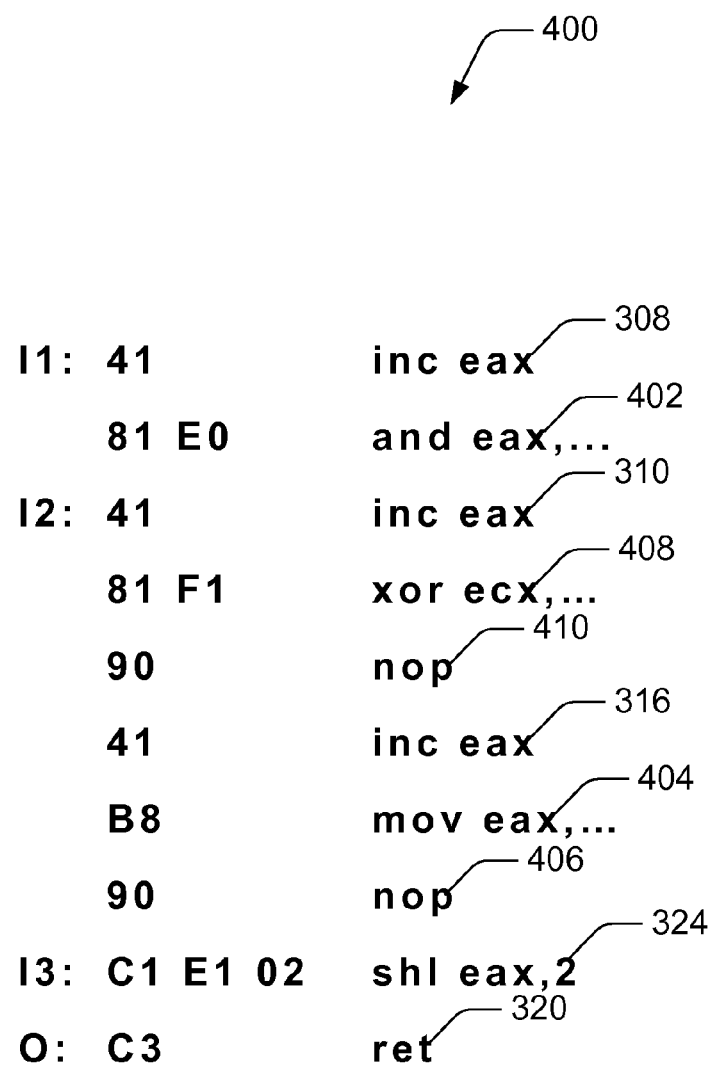
FIG. 4a illustrates an exemplary representation of a partially merged combination block of instructions.

FIG. 4a illustrates a partially merged combination block 400, which can be created from combination block 312 in one possible implementation of code merging. As shown, to create partially merged combination block 400, jump instructions 314, 318, 322 are removed from combination block 312, and replaced with intermediate replacement instructions. For example, jump instruction 314 is replaced with intermediate replacement instruction 402. Similarly, jump instruction 318 is replaced with intermediate replacement instructions 404, 406. Moreover, jump instruction 322 is replaced with intermediate replacement instructions 408, 410.

In one implementation, partially merged combination block 400 can be generated dynamically through use of the following instruction replacement algorithm:

| 1 | Read the locations of all N control instructions |
|---|---|
| 2 | For i=1 to N |
|   | a. M= Length(Addr(i+1)) |
|   | b. For j=0 to (M mod 4) |
|   |     i. Insert NOP at (Addr(i+2)) |
|   | c. X= select_instruction(M+2,P) |
|   | d. For j=0 to (length(Operand(X)) −2) |
|   |     i. Insert NOP at (Addr(i+1)) |
|   | e. Patch Addr(i+1) with Opcode(X) |
| 3 | Next i |

In such an implementation, Addr (I) can denote an address of a control instruction I, and Length (I) can denote the length of an instruction at address I. Similarly, Operand(X) can denote an operand of an instruction X. A binary rewriting tool, in code protection agent 104 for example, can automatically adjust the addresses of other instructions in the merged combination block 400. In one implementation, code protection agent 104 can effect an automatic adjustment of addresses of other instructions in the partially merged combination block 400.

The instruction replacement algorithm above utilizes pseudocode P and a length M of a following instruction. Pseudocode P can denote code used to replace control instructions, such as jump instructions 314, 318, 322, in interspersed blocks, such as combination block 312. Pseudocode P can also implement self-checking through, for example, integrity checks. For instance, pseudocode P can implement oblivious hashing of physical instructions and/or runtime program state.

Moreover, pseudocode P can depend on instructions to be replaced (i.e., obfuscation instructions) by intermediate replacement instructions, such as intermediate replacement instructions 402, 404, 406, 408, 410. In one possible implementation, pseudocode P can be used for instrumenting replacement instructions that are of a same bit-length as that of obfuscation instructions to be replaced. The result, denoted as R, of the computation of the pseudocode P can be stored in memory, such as other data 214.

In one implementation, pseudocode P is used for instrumenting intermediate replacement instructions that replace obfuscation instructions, including instructions associated with a sub-block other than the called sub-block. In another possible implementation, an opcode sequence of an original program or instructions can serve as an input to a function computed by pseudocode P. Additionally, a memory location, such as interspersed code(s) 210, or a register can include a unique result of a computation of pseudocode P. In yet another possible implementation, code replacing module 218 can evaluate the result R from pseudocode P.

Further, the instruction replacement algorithm above can find free destination registers and memory locations for storing intermediate results. In this way, static code properties like opcode bytes can be combined with dynamic program state properties during runtime (e.g., to implement oblivious hashing that checks both physical instruction bytes and runtime state). Moreover, opcode bytes can be an immediate operand in the injected instruction, and thus memory references rather than registers can be used.

If memory registers are used, the instruction replacement algorithm can craft injected instructions such that the injected instructions do not interfere with registers used by partially merged combination block 400. In case the injected instructions do interfere with registers used by partially merged combination block 400, the registers are spilled on the stack. Merged combination block 400 provides an example of code merging in which interspersed code and a pseudocode sequence such as "and R1,Y; xor R1,Y; mov R1,Y" is shown. In such a case, the instruction replacement algorithm matches R1 with a register ecx.

The merged instructions in partially merged combination block 400 do not interfere with the original code of sub-blocks 300, 302 in combination block 400. Instead, the merged instructions produce a different machine state in the register set. In the event that there are no spare registers available, code merging can free up additional registers such that fake instructions, including semantically neutral instructions, can be injected into instruction code in partially merged combination block 400.

FIG. 4b illustrates another implementation in which one or more integrity checks can be inserted into partially merged combination block 400, creating partially merged combination block 412. It will be noted, however, that instead of ending with a return statement, such as line 0 in partially merged combination block 400, partially merged combination block 412 directs processor(s) 106 to an integrity check 414. Integrity check 414 can be any integrity check known in the art, and can be used to check for tampering in one or more of partially merged combination block 412, sub-block 300, and sub-block 302.

In one implementation, integrity check 414 can be based on the instruction replacement algorithm cited above for generating partially merged combination block 400. For example, integrity check 414 can include a hash function h(R, EIP) using as arguments the result R and instruction pointer EIP. The instruction pointer EIP is an identifier that references a memory location where R resides.

H(x) can be any type of pre-image-resistant hash function, such as MD5. The interleaved code of partially merged combination block 412 verifies a hash computed in this manner, by using the hash value to look up a destination address in a pre-computed lookup table, for example lookup table L(x) stored in other data 214. Execution can then continue at this address. If the hash value and thus the address are wrong due to tampering, the programs found in sub-blocks 330, 302 in partially merged combination block 412, will most likely fail after jumping into incorrect code. In one implementation, code protection agent 104 can convert arguments R and EIP into their corresponding hash values. Values for integrity check 414, such as hash values obtained from hash function h(R, EIP), can be stored in other data 214.

Partially merged combination block 412 illustrates a manner in which a destination address in, for example, an address for register ecx can be computed and execution control can be transferred to the destination address. In one implementation, one or more control instructions, such as jump statements, are computed to ensure that the instructions in partially merged combination block 412 are resistant against tampering. Hence, whenever an individual attempting to tamper with instructions in partially merged combination block 412 attempts to relocate the call <jmp> instruction at line O (i.e., instruction 320), the instructions of partially merged combination block 412 will be altered.

Continuing with the instruction replacement algorithm example from above, in yet another implementation, replacement code(s) 212 can sample EIP and include the sample of EIP in the computation of R during runtime. Further, pseudocode P can include instructions which explicitly trigger an exception, such as division by zero, and an exception handler can add EIP to the computation of R.

In one possible implementation, code protection agent 104 can instrument pseudocode P such that pseudocode P includes instructions explicitly triggering an exception and the use of EIP in the computation of the argument R.

FIG. 4c illustrates merged combination blocks 416, 418 including instructions found in partially merged combination blocks 400, 412 as presented to processor(s) 106 at runtime. For example, merged combination block 416 corresponds to merged code generated when instructions associated with sub-block 300 in partially merged combination block 400 or partially merged combination block 412 are called for execution. Similarly, merged combination block 418 corresponds to merged instructions generated when instructions associated with sub-block 302 in partially merged combination block 400 or partially merged combination block 412 are called for execution.

As stated previously, instructions corresponding to sub-blocks 300, 302 can be executed by referencing entry points or starting command lines for sub-blocks 300, 302 (for example, lines I1 and I2, respectively, in partially merged combination blocks 400, 412).

Merged combination blocks 416, 418 can be formed by replacing intermediate replacement instructions—as well as instructions associated with other sub-blocks 300, 302, in partially merged combination blocks 400, 412—with replacement instructions, such as replacement instructions 420, 422, 424.

In one implementation, code replacing module 218 monitors instructions lying between a first command line of a called sub-block 300, 302 and next sequential command line of the called sub-block 300, 302. Lines of instructions lying between these command lines correspond to obfuscation instructions, that is either to control instructions or instruction lines of sub-blocks 300, 302 other than the called sub-block 300, 302.

For example, if sub-block 300 is called for execution, merged combination block 416 can be formed. In one implementation, this can be accomplished by code replacing module 218, which can scan partially merged combination blocks 400, 412 and track all instruction lines lying between the first command line 308 and the next sequentially following command line 316 of sub-block 300.

Instruction lines between command lines 308 and 316 correspond to intermediate replacement instructions 402, 408, 410 and instructions associated with sub-block 302 (i.e. instruction line 310).

On finding instructions 402, 408, 410, 310 that are to be replaced, code replacing module 218 replaces the instructions 402, 408, 410, 310 with a replacement instruction 420. Code replacing module 218 can similarly scan partially merged combination block 400, 412 for instructions lying between command lines 316 and 320. Code replacing module 218 can replace these instructions 404, 406, 324 with a replacement instruction 422.

If sub-block 302 is called for execution, merged combination block 418 can be formed. In one implementation merged combination block 418 can be formed by code replacing module 218, which can scan partially merged combination blocks 400, 412 and track all instructions lying between the first command line 310 and the next sequentially following command line 324 of sub-block 302.

Instructions between command lines 310 and 324 correspond to intermediate replacement instructions 404, 406, 408, 410 and instructions associated with sub-block 300 (i.e. instruction line 316).

On finding instructions 404, 406, 408, 410, 316 that are to be replaced, code replacing module 218 replaces the instructions 404, 406, 408, 410, 316 with a replacement instruction 424. Code replacing module 218 can similarly scan partially merged combination block 400, 412 for instructions lying between command lines 324 and 320. Since no intermediate instructions exist between instructions 324 and 320, no replacement instructions need to be inserted.

Replacement instructions 420, 422, 424 can be such that they do not interfere with the execution of called sub-blocks 300, 302. That is, replacement instructions can be inert, or semantically neutral with regard to the functioning of sub-block 300, 302 and merged combination blocks 416, 418. However, semantically neutral replacement instructions 420, 422, 424 can produce a different machine state in a register set of a memory when replacement instructions 420, 422, 424 are executed with other instructions associated with a called sub-block 300, 302. Examples of such changes in machine states include, but are not limited to, processes such as initialization of parameters that are not associated with the called sub-block 300, 302. In such cases, replacement instructions 420, 422, 424 may perform non-related functions in relation to the execution of sub-blocks 300, 302.

Moreover, in one implementation, replacement instructions 420, 422, 424 can have a same bit length as the instructions they replace. For example, replacement instruction 420 can have a same bit length as instructions 402, 408, 410, 310. Similarly, replacement instruction 422 can have a same bit length as instructions 404, 406, 324. Also, replacement instruction 424 can have a same bit length as instructions 404, 406, 408, 410, 316.

During execution of merged combination block 416, 418, execution control flows from first command line to a next command line. Since no control instructions exist in merged combination blocks 416, 418, execution control does not circumvent instructions that are not associated with a called sub-block 300, 302. However, as execution control reaches a next command line, an operation as per replacement instructions 420, 422, 424 for merged combination blocks 416, 418 is performed that does not interfere or is disassociated with the execution of the called sub-block 300, 302.

Exemplary Method(s)

Figure 5:
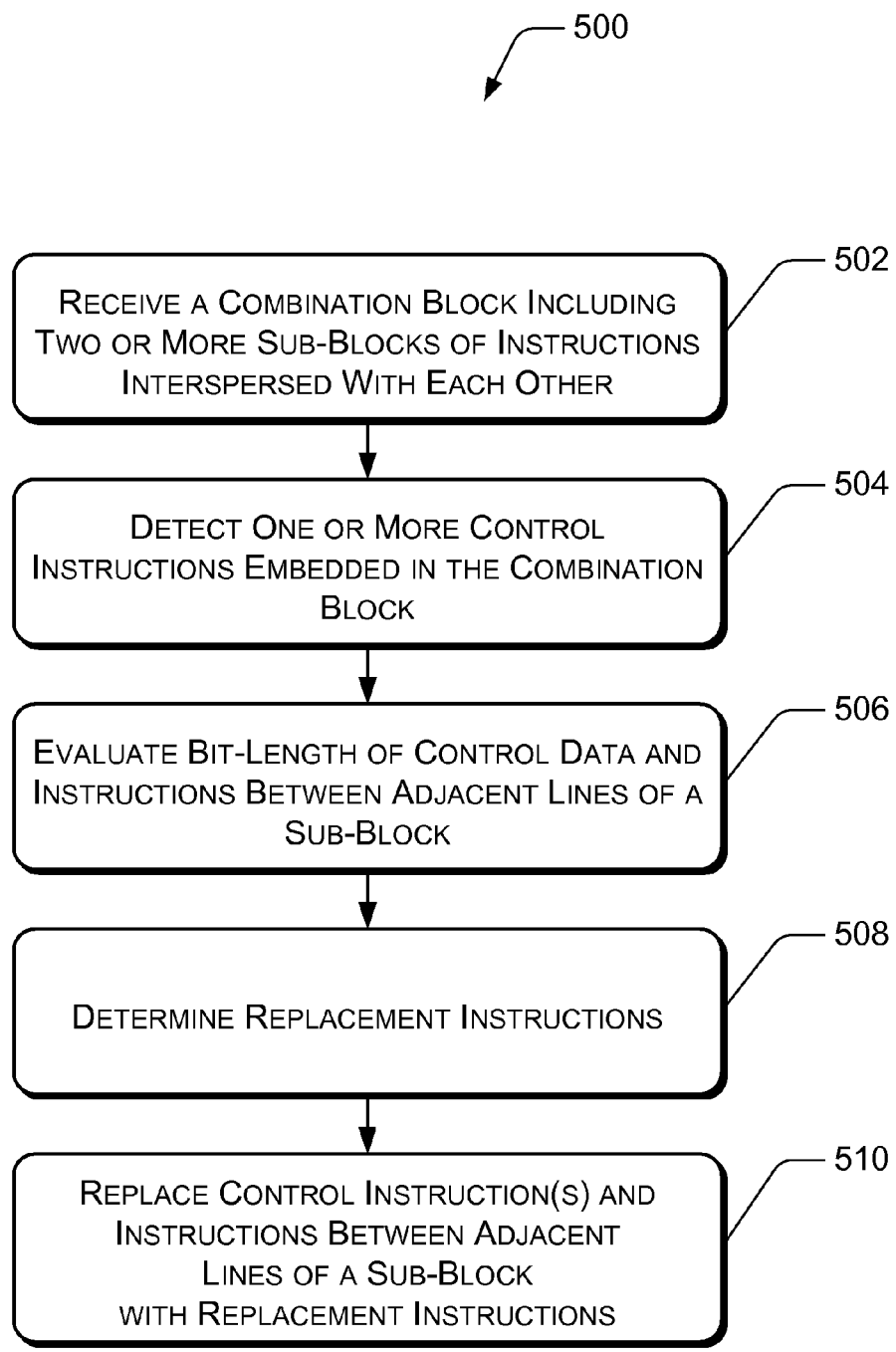
FIG. 5 illustrates an exemplary method(s) for implementing software protection using overlapping code.
Figure 6:
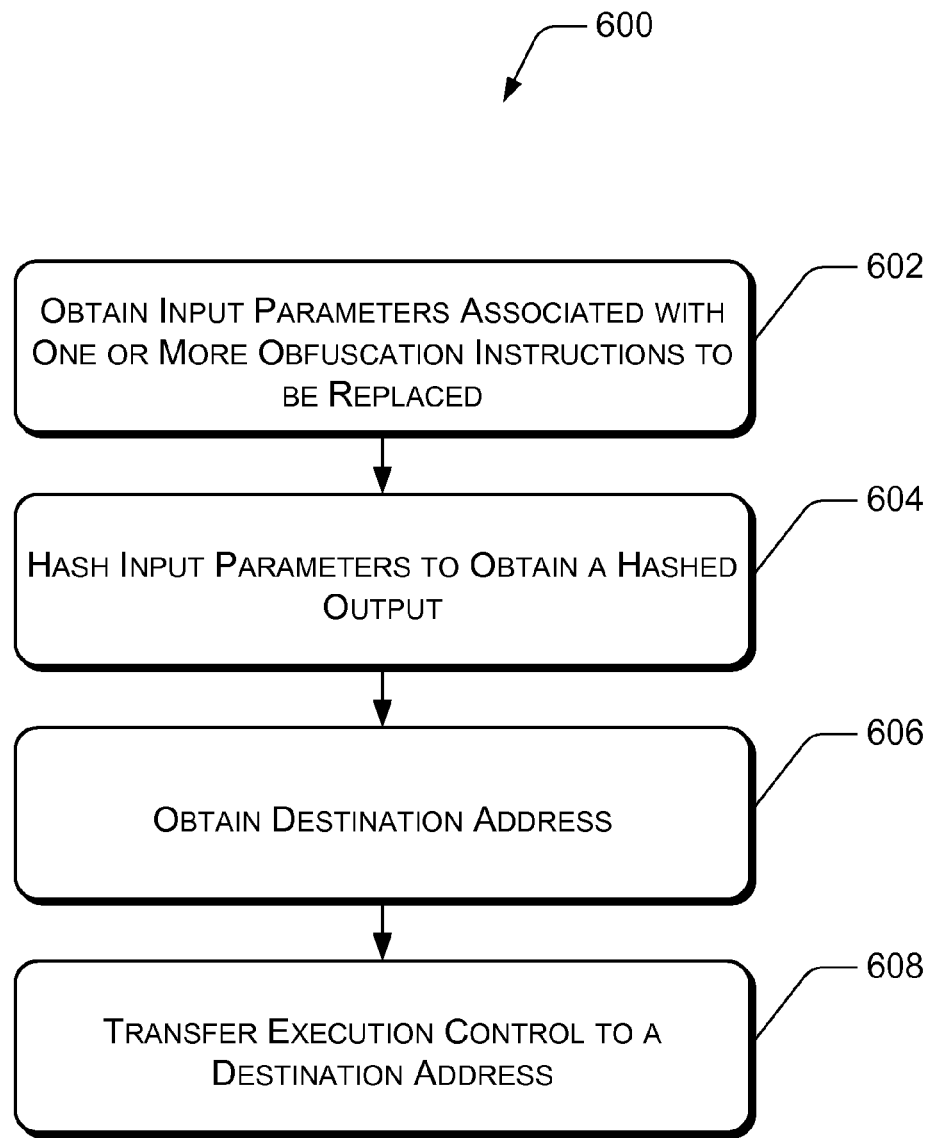
FIG. 6 illustrates an exemplary method(s) for implementing integrity checks within merged instructions.

In FIGS. 5-6 exemplary methods for implementing software code protection using code overlapping are described with reference to FIGS. 1-4. These exemplary methods may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

The exemplary methods are illustrated as a collection of blocks in a logical flow graph representing a sequence of operations that can be implemented in hardware, software, firmware or a combination thereof. The order in which the methods are described is not intended to be construed as a limitation, and any number of the described method blocks can be combined in any order to implement the methods, or alternate methods. Additionally, individual blocks may be deleted from the methods without departing from the spirit and scope of the subject matter described herein.

FIG. 5 illustrates an exemplary method 500 for implementing software protection using overlapping code on a computing-based device. At block 502, an interspersed combination block of instructions, such as interspersed combination block 312, is received. The interspersed combination block of instructions includes two or more sub-blocks of instructions, such as sub-blocks 300, 302, that are interspersed with each other. The interspersed combination block of instructions also includes control instructions, such as jump instructions, that guide execution control of a sub-block from one command line of a called sub-block to a next sequential command line of the called sub-block.

At block 504, one or more control instructions embedded in the interspersed combination block of instructions are detected by a code replacing module, such as code replacing module 218. For example, the code replacing module can scan through the interspersed combination block of instructions to identify and mark the location of control instructions in the interspersed combination block of instructions. In one implementation, the code replacing module can flag all obfuscation instructions which lie between sequential executable instructions in a sub-block. That is, the code replacing module can flag control instructions and intervening instructions from other sub-blocks lying between adjacent lines of a sub-block.

At block 506, bit-lengths of control instructions and intervening instructions between two adjacent instructions in a sub-block are determined. For example, a bit-length of control instruction 314, and instructions 310 and 322 is determined. Similarly, a bit-length of control instruction 318 and intervening instruction 324 is determined.

At block 508, replacement instructions are determined based on the control instructions and intervening instructions. For example, the code replacing module can isolate two sequential instructions in a sub-block such as instructions 308 and 316 in sub-block 300. The code replacing module can then determine a replacement instruction, such as instruction 420, which can replace all of the control instructions, such as instructions 314 and 322, and intervening instructions, such as instruction 310 between the two sequential instructions in the sub-block. In one implementation, the code replacing module selects replacement instructions that are of a same bit-length as the obfuscation instructions that are to be replaced.

At block 510, control instructions and intervening instructions that lie between two sequential instructions corresponding to a called sub-block are replaced with replacement instructions. For example, the code replacing module can replace instructions 310, 314, 322 with replacement instruction 420.

FIG. 6 illustrates an exemplary method for implementing integrity checks within a partially merged combination block, such as partially merged combination block 400 and partially merged combination block 412. At block 602, input parameters associated with one or more obfuscation instructions to be replaced with intermediate replacement instructions are received.

In one implementation, parameters such as pseudocode P and intermediate results R produced as a result of a computation associated with pseudocode P can used for implementing integrity checks within the partially merged combination block. Pseudocode P can depend on obfuscation instructions to be replaced by intermediate replacement instructions, such as intermediate replacement instructions 402, 404, 406, 408, 410.

For example, pseudocode P can be used for instrumenting replacement instructions that are of same bit length as the obfuscation instructions to be replaced. The result, denoted as R, of the computation of the pseudocode P can be stored in memory, such as in other data 214. In another implementation, the input parameters can be received by a replacing module, such as code replacing module 218.

At block 604, input parameters associated with the obfuscation instructions to be replaced are hashed. For example, the code replacing module can evaluate a hash value using R and the instruction pointer, denoted as EIP, associated with the pseudocode P as arguments. Examples of such hashing algorithms include any known hashing algorithms known in the art, such as MD5. In one implementation, the resulting hash value can be stored in memory, such as other data 214.

At block 606, a destination address is obtained. The destination address can be associated with the hashed value obtained from hashing R and the instruction pointer, denoted as EIP, associated with the pseudocode P. For example, a code protection agent, such as code protection agent 104, can verify the computed hash value, to look up a destination address in a pre-computed lookup table, such as lookup table L(x). The pre-computed lookup table can include hash values associated with corresponding destination addresses which reference a command line in a sub-block to which execution control can be transferred.

In one implementation, one or more checking control instructions, such as instruction 320 in partially merged combination block 412, are computed to ensure that the instructions in the partially merged combination block are resistant against tampering. Hence whenever an individual attempting to tamper with instructions in the partially merged combination block attempts to relocate the one or more checking control instructions, the instructions of partially merged combination block will be altered.

At block 608, execution control is transferred to the destination address. For example, the code replacing module transfers execution control to the destination address as obtained from the look-up table. The execution control can continue from the destination address. In the event that tampering has occurred, either the hash value or address, or both are altered. This results in the execution control being transferred to a non-intended code, thereby failing the execution of the intended code.

Exemplary Computer Environment

Figure 7:
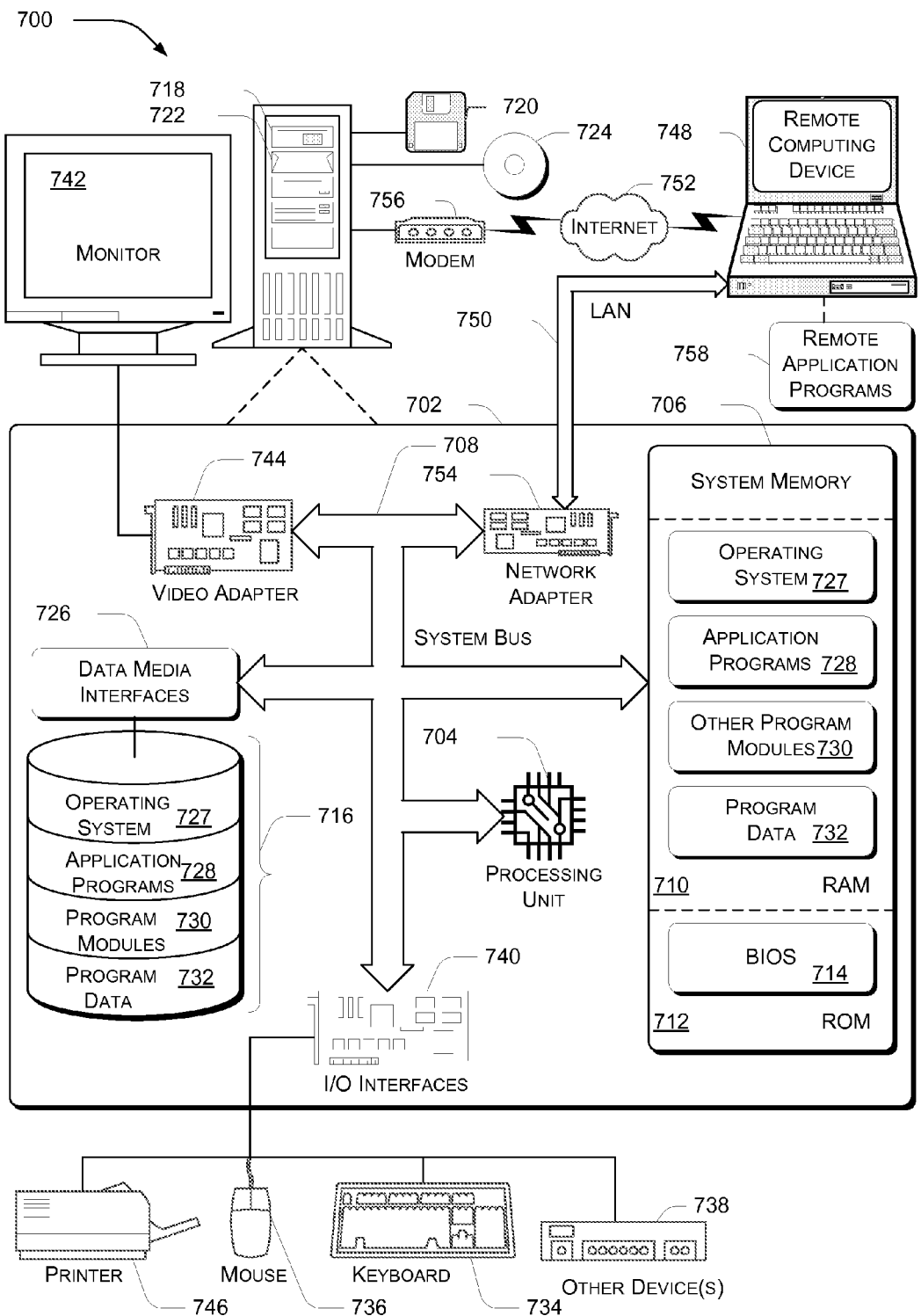
FIG. 7 illustrates an exemplary computer environment.

FIG. 7 illustrates an exemplary general computer environment 700, which can be used to implement the techniques described herein, and which may be representative, in whole or in part, of elements described herein. The computer environment 700 is only one example of a computing environment and is not intended to suggest any limitation as to the scope of use or functionality of the computer and network architectures. Neither should the computer environment 700 be interpreted as having any dependency or requirement relating to any one or combination of components illustrated in the example computer environment 700.

Computer environment 700 includes a general-purpose computing-based device in the form of a computer 702. Computer 702 can be, for example, a desktop computer, a handheld computer, a notebook or laptop computer, a server computer, a game console, and so on. The components of computer 702 can include, but are not limited to, one or more processors or processing units 704, a system memory 706, and a system bus 708 that couples various system components including the processor 704 to the system memory 706.

The system bus 708 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 702 typically includes a variety of computer readable media. Such media can be any available media that is accessible by computer 702 and includes both volatile and non-volatile media, removable and non-removable media.

The system memory 706 includes computer readable media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is stored in ROM 712. RAM 710 typically contains data and/or program modules that are immediately accessible to and/or presently operated on by the processing unit 704.

Computer 702 may also include other removable/non-removable, volatile/non-volatile computer storage media. By way of example, FIG. 7 illustrates a hard disk drive 716 for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD-ROM, or other optical media. The hard disk drive 716, magnetic disk drive 718, and optical disk drive 722 are each connected to the system bus 708 by one or more data media interfaces 726. Alternately, the hard disk drive 716, magnetic disk drive 718, and optical disk drive 722 can be connected to the system bus 708 by one or more interfaces (not shown).

The disk drives and their associated computer-readable media provide non-volatile storage of computer readable instructions, data structures, program modules, and other data for computer 702. Although the example illustrates a hard disk 716, a removable magnetic disk 720, and a removable optical disk 724, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 716, magnetic disk 720, optical disk 724, ROM 712, and/or RAM 710, including by way of example, an operating system 727, one or more application programs 728, other program modules 730, and program data 732. Each of such operating system 727, one or more application programs 728, other program modules 730, and program data 732 (or some combination thereof) may implement all or part of the resident components that support the distributed file system.

A user can enter commands and information into computer 702 via input devices such as a keyboard 734 and a pointing device 736 (e.g., a "mouse"). Other input devices 738 (not shown specifically) may include a microphone, joystick, game pad, satellite dish, serial port, scanner, and/or the like. These and other input devices are connected to the processing unit 1504 via input/output interfaces 740 that are coupled to the system bus 708, but may be connected by other interface and bus structures, such as a parallel port, game port, or a universal serial bus (USB).

A monitor 742 or other type of display device can also be connected to the system bus 708 via an interface, such as a video adapter 744. In addition to the monitor 742, other output peripheral devices can include components such as speakers (not shown) and a printer 746 which can be connected to computer 702 via the input/output interfaces 740.

Computer 702 can operate in a networked environment using logical connections to one or more remote computers, such as a remote computing-based device 748. By way of example, the remote computing-based device 748 can be a personal computer, portable computer, a server, a router, a network computer, a peer device or other common network node, and the like. The remote computing-based device 748 is illustrated as a portable computer that can include many or all of the elements and features described herein relative to computer 702.

Logical connections between computer 702 and the remote computer 748 are depicted as a local area network (LAN) 750 and a general wide area network (WAN) 752. Such networking environments are commonplace in offices, enterprise-wide computer networks, intranets, and the Internet.

When implemented in a LAN networking environment, the computer 702 is connected to a local network 750 via a network interface or adapter 754. When implemented in a WAN networking environment, the computer 702 typically includes a modem 756 or other means for establishing communications over the wide network 752. The modem 756, which can be internal or external to computer 702, can be connected to the system bus 708 via the input/output interfaces 740 or other appropriate mechanisms. It is to be appreciated that the illustrated network connections are exemplary and that other means of establishing communication link(s) between the computers 702 and 748 can be employed.

In a networked environment, such as that illustrated with computing environment 700, program modules depicted relative to the computer 702, or portions thereof, may be stored in a remote memory storage device. By way of example, remote application programs 758 reside on a memory device of remote computer 748. For purposes of illustration, application programs and other executable program components such as the operating system are illustrated herein as discrete blocks, although it is recognized that such programs and components reside at various times in different storage components of the computing-based device 702, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternately, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

Although embodiments of software protection using code overlapping have been described in language specific to structural features and/or methods, it is to be understood that the subject of the appended claims is not necessarily limited to the specific features or methods described. Rather, the specific features and methods are disclosed as exemplary implementations of software protection using code overlapping.

The invention claimed is:

1. A method implemented on a computing device by a processor, the method comprising:
    receiving a combination block comprising a first sub-block of instructions interspersed with one or more obfuscation instructions, wherein the obfuscation instructions include control instructions and successive instructions within the first sub-block are executable in proper sequence through use of the control instructions;
    replacing the one or more obfuscation instructions embedded between sequentially executable instructions of the first sub-block with replacement instructions comprising instructions that perform integrity checks to detect tampering with the first sub-block, including physical instructions or runtime state, wherein the integrity checks are configured to implement oblivious hashing via overlapped code, the replacement instructions having a bit length equal to a bit length of the one or more obfuscation instructions.

2. The method of claim 1, wherein receiving comprises receiving the first sub-block of instructions and embedding obfuscation instructions between the sequentially executable instructions of the first sub-block of instructions.

3. The method of claim 1, wherein receiving farther comprises:
    receiving a second sub-block of instructions; interspersing sequentially executable instructions associated with the first sub-block of instructions and sequentially executable instructions associated with the second sub-block of instructions to result in an interspersed block; and
    embedding one or more control instructions in the obfuscation instructions in the interspersed block such that the obfuscation instructions are embedded between selected sequentially executable instructions of the first sub-block of instructions and selected sequentially executable instructions of the second sub-block of instructions, enabling sequential processing of the first sub-block of instructions and the second sub-block of instructions.

4. The method of claim 1, wherein replacing the one or more obfuscation instructions includes replacing at least one instruction from a second sub-block of instructions.

5. The method of claim 1, wherein the obfuscation instructions maintain a flow of execution of the sequentially executable instructions associated with the first sub-block.

6. The method of claim 1, wherein replacing comprises replacing the one or more of the obfuscation instructions with at least one of:
   semantically neutral instructions; instructions for performing integrity checks on at least one of:
   the sequentially executable instructions;
   a runtime state of the first sub-block of instructions.

7. The method of claim 1, wherein replacing is performed during runtime.

8. The method of claim 1, further comprising computing a hash value of the first sub-block of instructions in accordance with additional instructions in the combination block.

9. One or more computer-readable media comprising computer executable instructions that, when executed, perform acts comprising:
   receiving a combination block comprising a first sub-block of instructions and a second sub-block of instructions, wherein sequentially executable instructions associated with the first sub-block are interspersed with sequentially executable instructions associated with the second sub-block, and further wherein, control instructions are embedded between selected sequentially executable instructions of the first and second sub-blocks enabling a processor to execute the sequentially executable instructions of the first and second sub-blocks in sequence;
   replacing control instructions and sequentially executable instructions of the second sub-block lying between at least two of the selected sequentially executable instructions associated with the first sub-block with replacement instructions comprising instructions that perform integrity checks to detect tampering with a selected sub-block, including physical instructions or runtime state, wherein the integrity checks are configured to implement oblivious hashing via overlapped code, wherein the replacement instructions have a same bit length as the replaced control instructions and the sequentially executable instructions of the second sub-block, and further wherein the replacement instructions enable the processor to execute the sequentially executable instructions of the first sub-block in sequence.

10. The computer-readable media of claim 9, further comprising computer-executable instructions that, when executed, perform acts comprising replacing the control instructions and the sequentially executable instructions of the second sub-block lying between at least two of the selected sequentially executable instructions associated with the first sub-block, with at least one of:
   one or more semantically neutral instructions;
   one or more instructions configured to perform one or more integrity checks on the sequentially executable instructions of the first sub-block.

11. The computer-readable media of claim 9, further comprising computer-executable instructions that, when executed, perform acts comprising replacing the control instructions and the sequentially executable instructions of the second sub-block lying between the at least two of the selected sequentially executable instructions associated with the first sub-block with the replacement instructions at runtime.

12. The computer-readable media of claim 9, further comprising computer-executable instructions that, when executed, perform acts comprising computing a hash value of the first sub-block of instructions.

13. The computer-readable media of claim 9, further comprising computer-executable instructions that, when executed, perform acts comprising computing a hash value of the first sub-block of instructions and associating the hash value with a destination address, wherein the destination address references a location affecting an execution control of the first sub-block.

14. A system comprising:
   one or more processors;
   a memory; and
   a code protection agent configured to:
   process a combination block having two or more sub-blocks of instructions, wherein instructions from the two or more sub-blocks are interspersed among one another;
   enable the one or more processors to execute adjacent instructions from a selected sub-block in proper sequence through use of control instructions;
   replace instructions embedded between adjacent instructions of the selected sub-block with semantically neutral replacement instructions; and
   compute a hash value of the combination block in accordance with replaced instructions in the combination block.

15. The system of claim 14, wherein the semantically neutral replacement instructions have a bit length equal to a bit length of the one or more instructions embedded between the adjacent instructions of the selected sub-block.

16. The system of claim 14, wherein the combination block further comprises control instructions embedded between the instructions of the two or more sub-blocks, wherein the control instructions are configured to maintain a flow of execution of the instructions associated with the two or more sub-blocks of instructions.

17. The system of claim 16, wherein the code protection agent is configured to replace the control instructions from any of the two or more sub-blocks not being executed.

18. The system of claim 14, wherein the replacement instructions comprise at least one of:
   inert instructions;
   instructions for performing integrity checks on instructions associated with the two or more sub-blocks.

19. The system of claim 14, wherein the code protection agent is configured to replace instructions embedded between adjacent instructions of the selected sub-block with semantically neutral replacement instructions at runtime.

20. The system of claim 14, wherein the combination block further comprises instructions configured to compute a hash value of the selected sub-block of instructions.

* * * * *

UNITED STATES PATENT AND TRADEMARK OFFICE
CERTIFICATE OF CORRECTION

| | | |
|---|---|---|
| PATENT NO. | : 7,664,937 B2 | Page 1 of 1 |
| APPLICATION NO. | : 11/681160 | |
| DATED | : February 16, 2010 | |
| INVENTOR(S) | : Matthias Jacob | |

It is certified that error appears in the above-identified patent and that said Letters Patent is hereby corrected as shown below:

In column 14, line 56, in Claim 3, delete "farther" and insert -- further --, therefor.

Signed and Sealed this

Eighth Day of February, 2011

David J. Kappos
*Director of the United States Patent and Trademark Office*